US008963399B2

(12) United States Patent
Tekawade et al.

(10) Patent No.: US 8,963,399 B2
(45) Date of Patent: Feb. 24, 2015

(54) INDUCTION MACHINE SHORT CIRCUIT STOP AND METHOD FOR INSTALLATION

(75) Inventors: Avinash M. Tekawade, Wexford, PA (US); David F. Yurko, Monroeville, PA (US); Domingo J. Fumero, North Huntingdon, PA (US); Sean Woosley, Winter Springs, FL (US)

(73) Assignee: Siemens Energy, Inc., Orlando, FL (US)

( * ) Notice: Subject to any disclaimer, the term of this patent is extended or adjusted under 35 U.S.C. 154(b) by 776 days.

(21) Appl. No.: 13/290,172

(22) Filed: Nov. 7, 2011

(65) Prior Publication Data

US 2013/0113342 A1 May 9, 2013

(51) Int. Cl.
*H02K 1/12* (2006.01)
*H02K 3/50* (2006.01)
*H02K 1/18* (2006.01)

(52) U.S. Cl.
CPC .............. *H02K 3/505* (2013.01); *H02K 1/185* (2013.01)
USPC .. 310/254.1; 310/260; 310/418; 310/216.004

(58) Field of Classification Search
USPC ...................... 310/254.1, 260, 270, 418, 432
See application file for complete search history.

(56) References Cited

U.S. PATENT DOCUMENTS

| | | | | |
|---|---|---|---|---|
| 3,320,452 A | | 5/1967 | Fortenbach, et al. | |
| 3,988,625 A | * | 10/1976 | Jager et al. | 310/260 |
| 4,070,750 A | | 1/1978 | Brennan et al. | |
| 4,088,913 A | * | 5/1978 | Prigorovsky et al. | 310/260 |
| 4,126,799 A | * | 11/1978 | Iogansen et al. | 310/260 |
| 4,227,109 A | * | 10/1980 | Mulach | 310/216.114 |
| 4,752,708 A | * | 6/1988 | Jager et al. | 310/260 |
| 5,693,996 A | * | 12/1997 | Neidhofer et al. | 310/260 |
| 5,729,073 A | * | 3/1998 | Rowe et al. | 310/260 |
| 5,798,595 A | * | 8/1998 | Nilsson et al. | 310/260 |
| 6,777,853 B2 | * | 8/2004 | Rowe et al. | 310/260 |
| 6,965,184 B2 | * | 11/2005 | Hediger et al. | 310/260 |

FOREIGN PATENT DOCUMENTS

EP 0669694 A1 8/1992

OTHER PUBLICATIONS

Moeller-Werr "Leitfaden der Elektrotechnik, Band III, Konstruktion elektrischer Maschinen," 1950, B G Teubner Verlagsgesellschaft, Leipzig, XP002717998, pp. 94-103, fig 97 4.

* cited by examiner

*Primary Examiner* — Burton Mullins (57) ABSTRACT

An induction machine short circuit stop is interposed between a brace and a machine component, such as a generator building bolt, in order to limit component motion during a short circuit event. The stop is a block of resilient non-conductive material that is oriented proximal the machine component at a desired spaced gap. Gap dimensions may be modified by use of different height stop blocks and/or shims. The stop is affixed to the brace by straps, cordage or fasteners, such as threaded studs. The stop is suitable for retrofitting existing induction machines in the field or in refurbishing service centers.

20 Claims, 8 Drawing Sheets

INDUCTION MACHINE SHORT CIRCUIT STOP AND METHOD FOR INSTALLATION

BACKGROUND OF THE DISCLOSURE

1. Field of the Invention

The invention relates to short circuit stops for induction machines that restrict relative motion between a paired induction machine component and a brace. More particularly the invention relates to generator short circuits stops and their methods for installation, including replacement during generator retrofitting in service facilities or at field installation sites.

2. Description of the Prior Art

Induction machines, such as generators, have components capable of motion during machine operation. It is often desirable to limit motion range of components. For example, generator stators have a generally annular structure in which is captured a rotor. The generator stator annular structure has an end basket affixed to one end by building bolts having a stack of compressible end washers to allow a limited range of expansion and contraction. In a short circuit event it is desirable to restrain axial and radial movement of the building bolts. The building bolts are restrained by one or more braces that are interposed within the bolt's potential range of motion at a selective gap distance. A stop is interposed between the paired building bolt and brace. The stop may be selectively positioned to set a desired gap or spacing between itself and a paired component, such as a building bolt. Depending on the stop design, the gap may be altered or permanently set.

One type of existing generator stop is a threaded stop stud that is captured within mating female threads formed in the generator brace. The threaded stud is advanced into the brace so that it is selectively positioned proximal to the building bolt or other apparatus component whose motion is intended to be restrained by the stop. The threaded stop stud has a relatively thin diameter compared to its projection length out of the generator bracket, and thus is susceptible to bending during a generator short circuit event. Threaded stop stud replacement requires careful removal of the old stop stud, so as not to damage the corresponding female threads within the generator brace. Damaged female threads require repair before inserting a new threaded stop stud. The threaded stop stud dimensions vary among different generator models and, it may not be possible to ascertain with certainty needed replacement stud dimensions prior to generator disassembly. Thus additional generator down time may be incurred during the repair cycle while service technicians obtain replacement stud parts.

Another type of existing generator stop is an L-shaped bracket, one leg of which is permanently affixed to the generator brace, such as by welding. The other leg of the L-shaped bracket is oriented generally parallel to the brace and functions as the stop surface to restrain the building bolt or other apparatus component. Positioning the L-shaped bracket relative to the building bolt is accomplished by hand, and the bracket is clamped to the brace prior to the welding operation. Different generator configurations require different dimension brackets, and those dimensions may not necessarily be ascertained until the subject generator is removed from service and disassembled for inspection. This in turn requires ordering of L-bracket parts after initial disassembly, and possibly longer generator down time until the appropriate L-brackets are obtained. L-brackets are permanently attached to the generator brace, such as by welding procedures. Subsequent generator rebuilds and/or service may require time-consuming removal of the welded L-brackets, followed by re-welding of replacement brackets to the generator brace.

Thus, a need exists in the art for a short circuit stop for an induction machine, such as a generator, having robust construction that is not easily susceptible to damage in the event of a generator short circuit event.

Another need exists in the art for a short circuit stop capable of field installation without permanent attachment to induction machine components, such as generator braces, that can be selectively installed and uninstalled, preferably without modification of the underlying support components.

Another need exists in the art for a short circuit stop capable of meeting dimensional and configuration requirements of different induction machine designs, directly out of the box or by field fitting, so that the types of short circuit stop spare parts can be minimized in service inventory; or if not available in inventory, preferably quickly fabricated after initial repair disassembly and inspection so as to minimize repair down time.

SUMMARY OF THE INVENTION

Accordingly, an object of the invention is to create a short circuit stop having robust construction that is not easily susceptible to damage in the event of a generator short circuit event.

Another object of the invention is to create a short circuit stop that capable of quick field installation, preferably without permanent modification of or attachment to induction machine components, such as generator braces, that can be selectively installed and uninstalled.

An additional object of the invention is to create a short circuit stop that is capable of being adapted to meet the dimensional and configuration requirements of different generator or other induction machine designs—directly out of the box or by field fitting—so that the types of short circuit stop spare parts can be minimized in service inventory; or if not available in inventory, preferably quickly fabricated after initial repair disassembly and inspection, so as to minimize repair down time.

These and other objects are achieved in accordance with the present invention by an induction machine short circuit stop that is interposed between a brace and a machine component, such as a generator building bolt, in order to limit component motion during a short circuit event. The stop is a block of material that is oriented proximal the machine component at a desired spaced gap. Gap dimensions may be modified by use of different height stop blocks and/or shims. The stop affixed to the brace by straps, cordage or fasteners, such as threaded studs. The stop is suitable for retrofitting existing induction machines in the field or in refurbishing service centers.

One aspect of the present invention features a stop apparatus for limiting relative movement between a paired induction machine component and a brace, including a stop block adapted for interposition between the paired components, with the stop block having a bottom face for abutment against one of the paired components, a top face in opposed spaced orientation relative to the other component, and defining a gap there between, and an engagement surface. A fastener is coupled to the engagement surface and the one of the paired components, for affixing the stop block thereto.

The present invention also features an induction machine apparatus having a paired induction machine component and brace capable of relative movement there between during an electrical short circuit event within the machine. A stop block is interposed between the paired components for limiting the relative movement between the paired components, with the stop block having a bottom face for abutment against one of the paired components, a top face in opposed spaced orientation relative to the other component and defining a gap there between, and an engagement surface. A fastener is coupled to the engagement surface and the one of the paired components, for affixing the stop block thereto.

Yet another feature of the present invention is a method for installing a short circuit stop block in an induction machine generator apparatus of the type having a building bolt and a generator brace that are capable of relative movement there between during an electrical short circuit event within the generator, so that the stop block limits such relative movement. The method comprises providing a stop block having a bottom face; a top face; and an engagement surface. The stop block is interposed between the building bolt and the generator brace by abutting the bottom surface against the generator brace. The stop block is affixed to the generator brace with a fastener coupled to the engagement surface and the generator brace.

The objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of the present invention can be readily utilized in induction machine short circuit stops that restrict relative movement between a paired induction machine component and brace, such as between a generator building bolt and brace.

General System Overview

Figure 1:
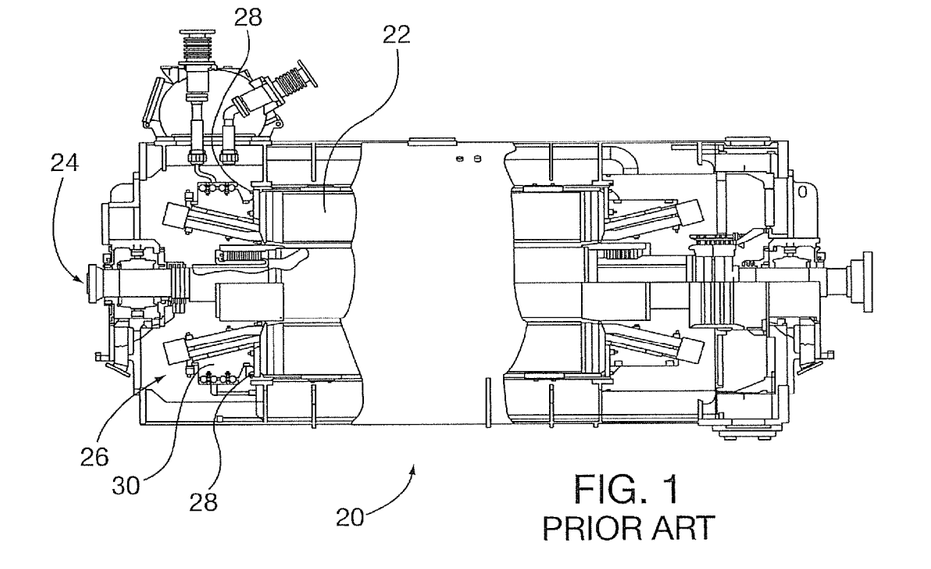
FIG. 1 shows schematically a prior art induction machine generator stator end winding support structure that includes respective pairs of building bolt components and generator short circuit stops.
Figure 2:
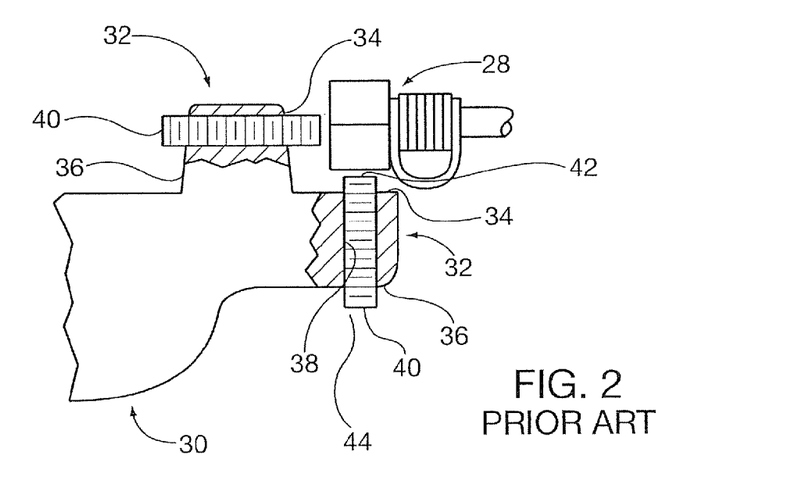
FIG. 2 is a side elevational view of a prior art generator stop.
Figure 3:
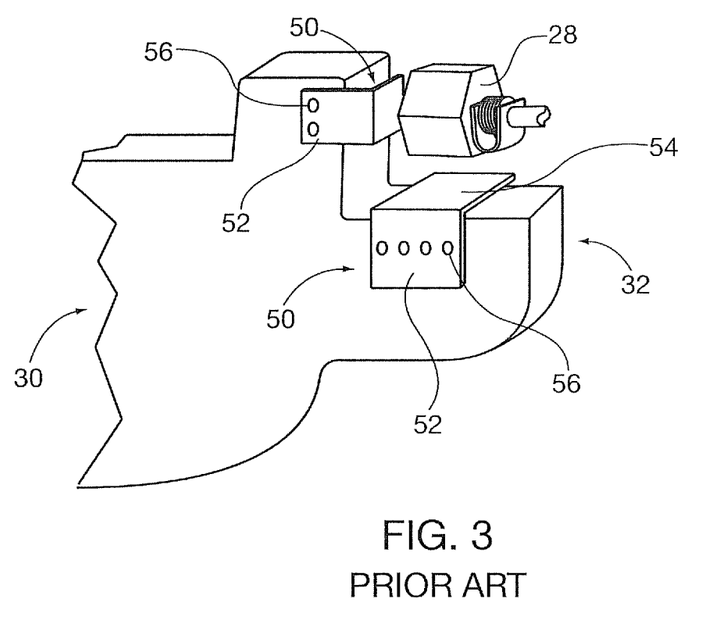
FIG. 3 is a perspective view of another prior art generator stop.

FIGS. 1-3 show an exemplary known induction machine generator 20 and known short circuit stops 40, 50. Referring to FIG. 1, generator 20 has a generally annular-shaped stator core 22 within which is captured rotating shaft/rotor 24. A generator end basket 26 is mounted on an axial end of the stator core 22 by a plurality of axially extending building bolts 28 that are oriented about the generator circumferential periphery. The building bolt 28 typically includes a stack of axially compressible washers that are captured by a spring clip and threaded nut that engages a mating threaded end of the male bolt structure, in order to accommodate axial expansion of the generator core structure during operation.

As previously described above, it is desirable to limit axial and radial movement of the building bolt 28, such as during a short circuit event. As shown in FIGS. 2 and 3, a generator brace 30 is paired with a corresponding building bolt 28. The generator brace 30 has respective bosses 32 that are oriented to restrain respective axial and radial movement of the building bolt 28. Each boss 32 has a proximal face 34 that is oriented in opposed spaced relationship with the building bolt 28 as well as a distal face 36. The respective bosses 32 also have threaded female bores 38 formed between the proximal 34 and distal 36 faces, for receipt of a threaded stop stud 40. Each stop stud 40 has a proximal tip 42 in opposed spaced relationship with the building bolt 28, the gap between which may be selectively varied by advancing or withdrawing the stop stud 40 distal tip 44 with an appropriate tool.

FIG. 3 shows a known alternative embodiment pair of short circuit stops 50 that restrain building bolt motion axially and radially. Each respective stop 50 constructed of L-shaped sheet metal material having a distal leg 52 affixed to the generator brace boss 32, such as by spot or tack welds 56 and a proximal leg 54 oriented in opposed spaced relationship with the building bolt 28. The gap between each respective stop proximal end 54 and its paired building bolt 28 is selectively and permanently set before affixing distal end 52 to its corresponding generator brace boss 32. The short circuit stop 50 may be retrofitted to an existing generator boss 32 as a substitute for a prior threaded stop stud 40: for example if replacement stop studs are not readily procured within a desired timeframe or if the threaded bore 38 is damaged when removing the existing stop stud. However, once a stop 50 is permanently affixed to a generator brace boss 32 it has to be removed by cutting or grinding operations in order to change the gap between the proximal end 54 and the building bolt, or if that stop is subsequently found to be damaged beyond repair in a future generator maintenance cycle.

Short Circuit Stop of the Present Invention

Figure 4:
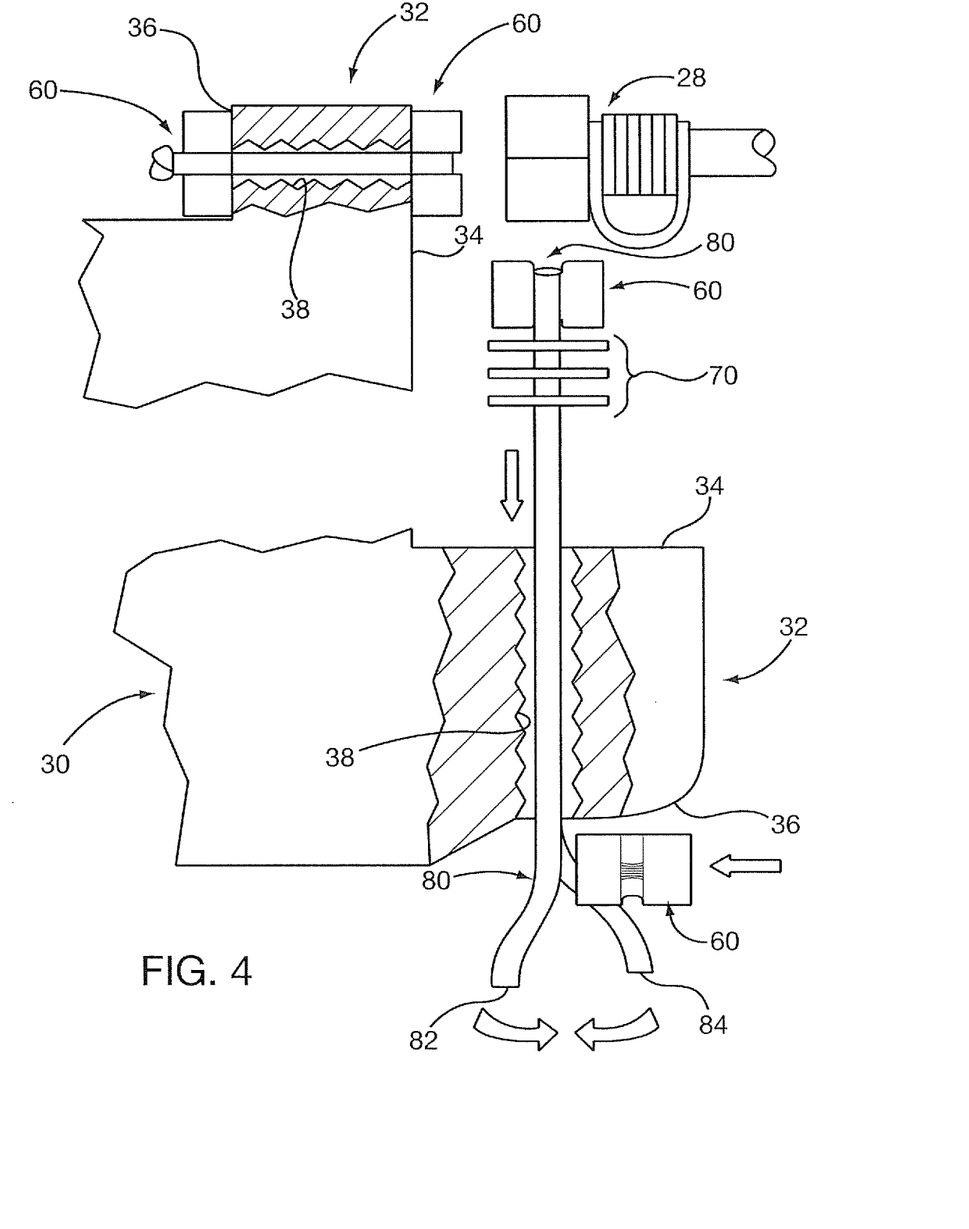
FIG. 4 is a side elevational view of the generator stop of the present invention.
Figure 5:
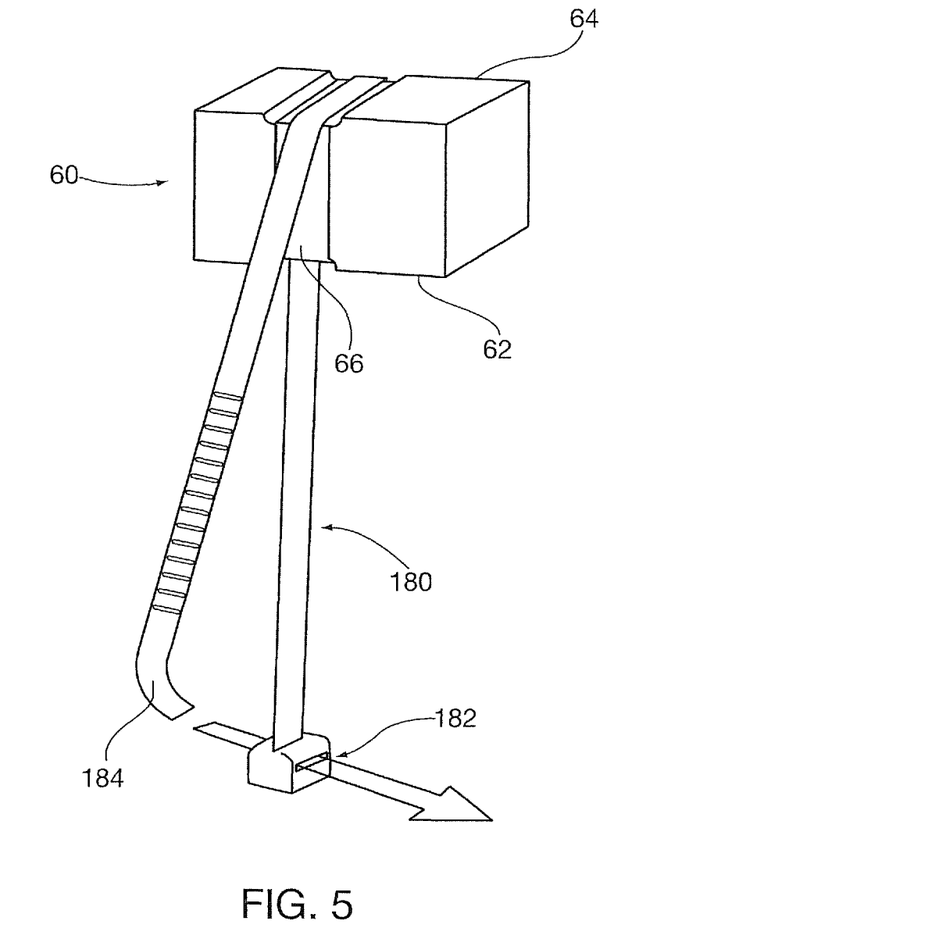
FIG. 5 is a perspective view of an alternate embodiment of the generator stop of the present invention.

Referring to FIGS. 4 and 5, short circuit stops 60 of the present invention are interposed between the respective proximal faces 34 of the generator brace 30 and the paired building bolt 28. The stop 60 is preferably constructed of a resilient non conductive material, such as an epoxy laminate, that may be molded in final form or shaped from a block of material. Other suitable materials include thermosetting or thermoplastic resins, as well as elastomers, that are suitable for the induction machine's operational parameters. As shown, the stop 60 preferably has a flat bottom face 62 that is abutted against a corresponding proximal face 34 of the generator brace boss 32 and a top face 64 that is in opposed, spaced orientation relative to the building bolt 28. The gap between the stop block 60 and the building bolt 28 may be selectively adjusted by varying the block 60 thickness between the top 64 and bottom 62 faces and/or by selective addition of one or more spacers, such as shims 70. The stop 60 top face 64 limits the building bolt 28 range of motion by direct compressible contact. Unlike the previously known stop studs 40 and stop brackets 50, the stop 60 of the present invention is less likely to be permanently deformed or damaged during a short circuit event, due to its preferred resilient material construction, ability to distribute compressive loads throughout its structure and relatively large abutting surface contact area with the brace proximal face 34.

The stop block 60 of FIGS. 4 and 5 has an engagement surface 66 that is this embodiment is a necked, concave surface formed in the top face 64 and flanking lateral sides, so that the block structure has a generally dog-bone profile. As shown, an elongated flexible fastener, such as a non-conductive cordage, tape, cloth or strap 80 is affixed to stop block 60 by wrapping it about the engagement surface 66 and passing the respective ends 82, 84 through the generator brace bore 38 that previously retained a stop stud 40. The flexible fastener strap 80 is tensioned about another stop block 60 or other rigid member that is oriented on the opposite side of the bore 38 on the distal face 36 of the boss 32, and subsequently tied off or otherwise affixed to the boss. By passing the fastener strap 80 through the existing generator brace boss aperture 38 the block 60 is restrained against the boss proximal face 34 without the necessity of creating new fastener holes or attachment points as is required for installation of the prior art stop brackets 50. Similarly, the boss aperture 38 threads need not be repaired in order to receive the strap fastener 80, as might otherwise be required if a replacement stop stud 40 were utilized in lieu of the stop block of the present invention. Attachment of the stop block 60 of the present invention does not require permanent alteration of the generator brace 30 or its bosses 32. The stop block 60 may be selectively removed from the generator by unfastening, or cutting of the fastener strap 80.

Figure 6:
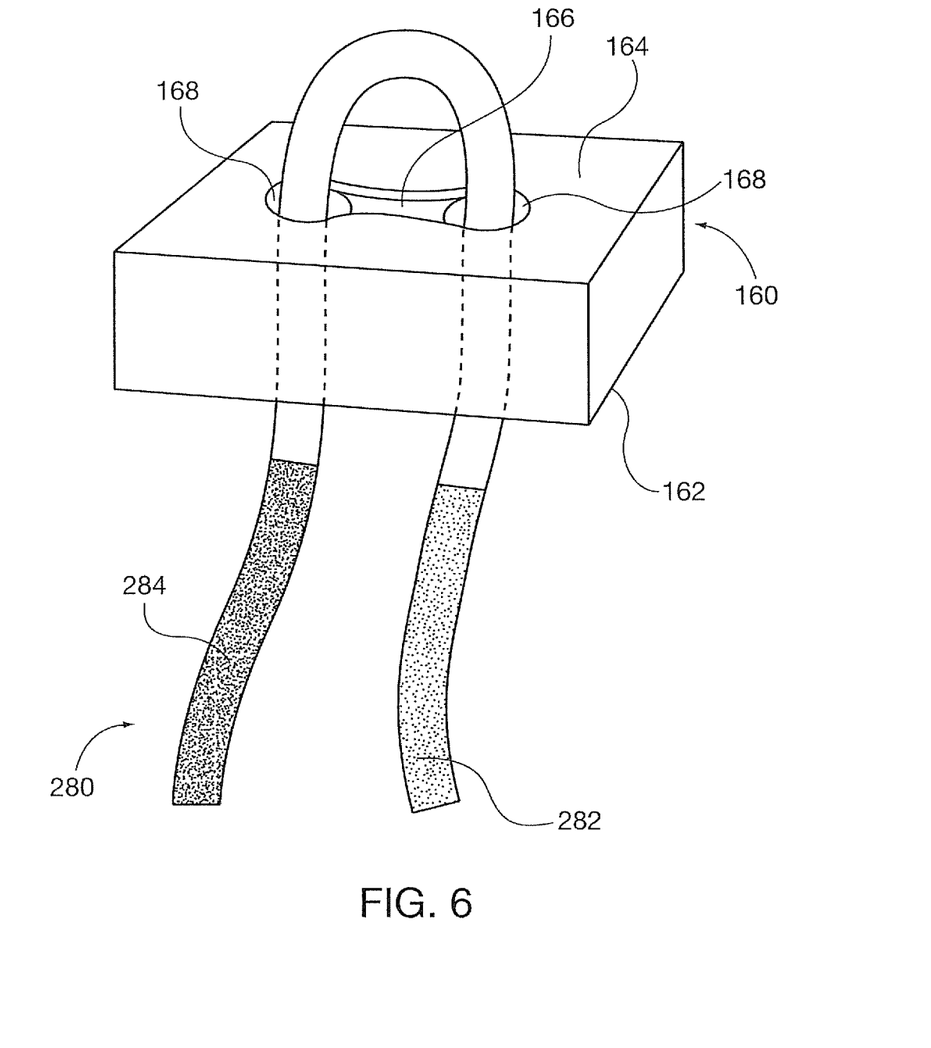
FIG. 6 is a perspective view of an another alternate embodiment of the generator stop of the present invention.

While FIG. 4 shows an exemplary fastener strap 80 having tied off ends 82, 84, other types of fasteners may be utilized in the present invention. In FIG. 5, strap fastener 180 is a cable tie having engageable respective mating pawl 182 and ratchet 184 ends, that eliminate the need to tie free ends of the fastener. The pawl end 184 of cable tie fastener 180 is passed through the brace aperture 38 from the distal face 36 to the proximal face 34 of the boss 32, over the stop block engagement surface 66 and retracted back through the aperture 38 to mate with the ratchet end 182. In FIG. 6, Stop block 160 has a recessed engagement surface 166 and a pair of through bores 168 from the bottom surface 162 to the top surface 164 through which pass fastener strap 280, that has respective mating hook and loop fastener ends 282, 284.

Figure 7:
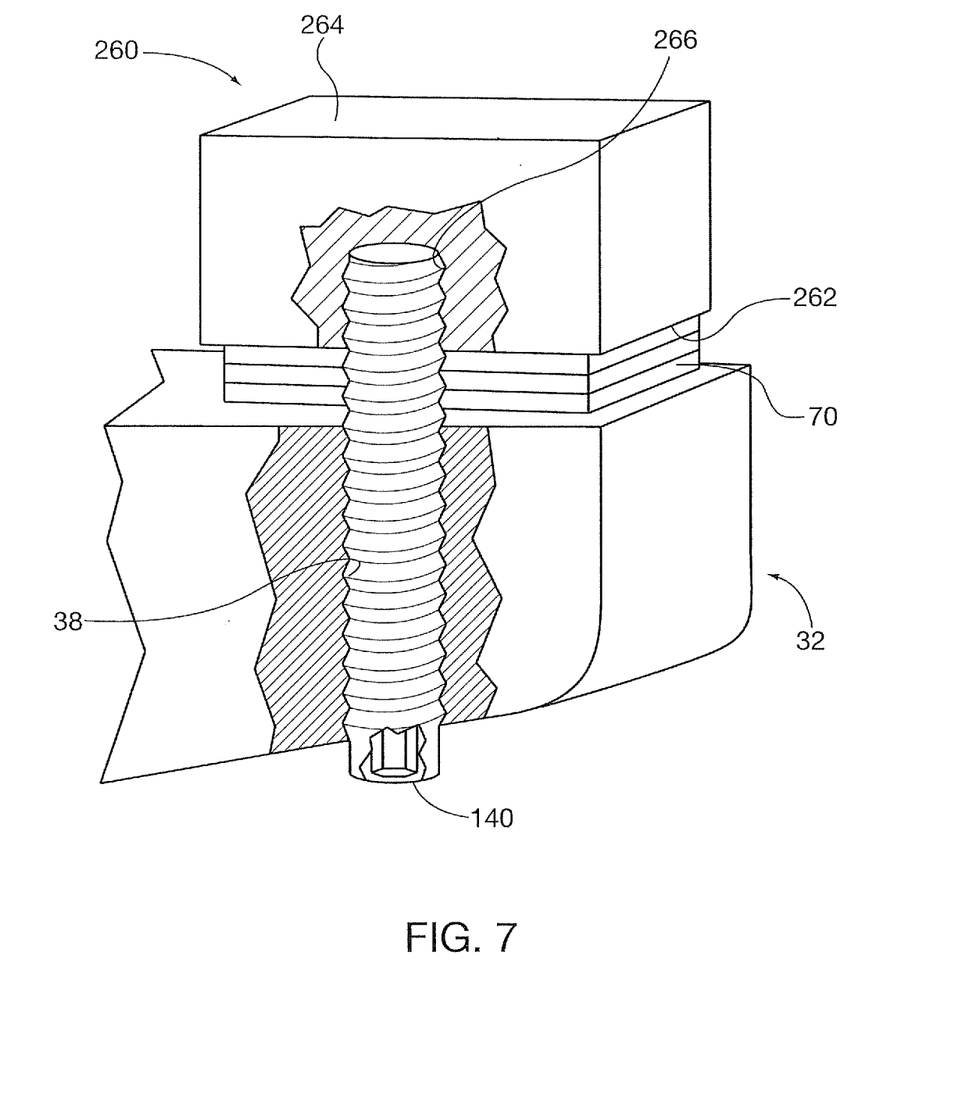
FIG. 7 is a perspective view of an additional alternate embodiment of the generator stop of the present invention.

Another stop block 260 embodiment is shown in FIG. 7, wherein the bottom surface 262 defines a threaded aperture 266 for mating receipt of threaded stud 140. The stud 140 is advantageously captured within the generator brace threaded female bore 38. Alternatively, the threaded stud 140 may have a smaller diameter than the threaded bore 38 and an alternative mating threaded engagement with a female threaded fastening element oriented outside the distal face 36 of the generator brace 30. A screw with fastening head may be substituted for the stud 140, in which case the screw distal end threads engage within the stop block engagement aperture 262. One or more spacer shims 70 may be utilized to alter the gap between the stop block top face 264 and the corresponding paired building bolt 28.

Figure 8:
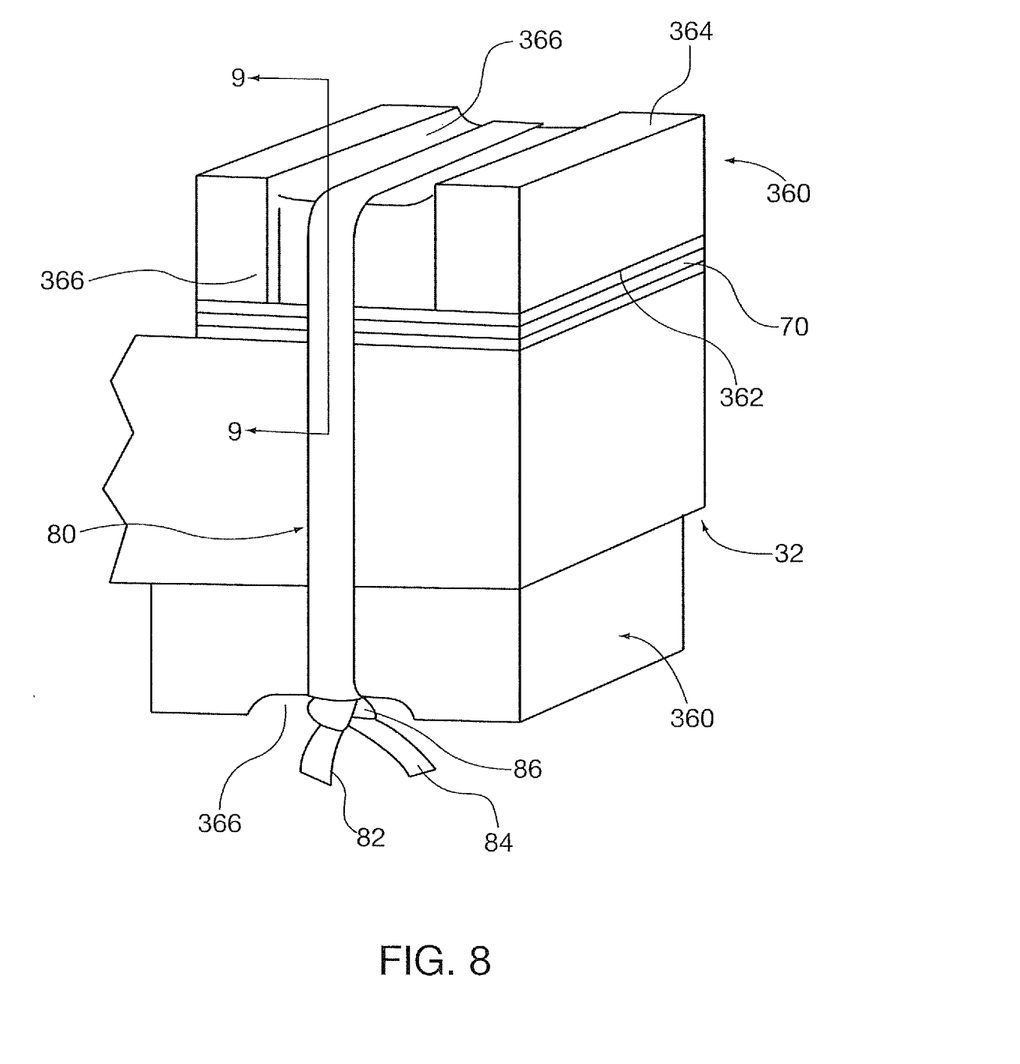
FIG. 8 is a perspective view of an yet another alternate embodiment of the generator stop of the present invention.
Figure 9:
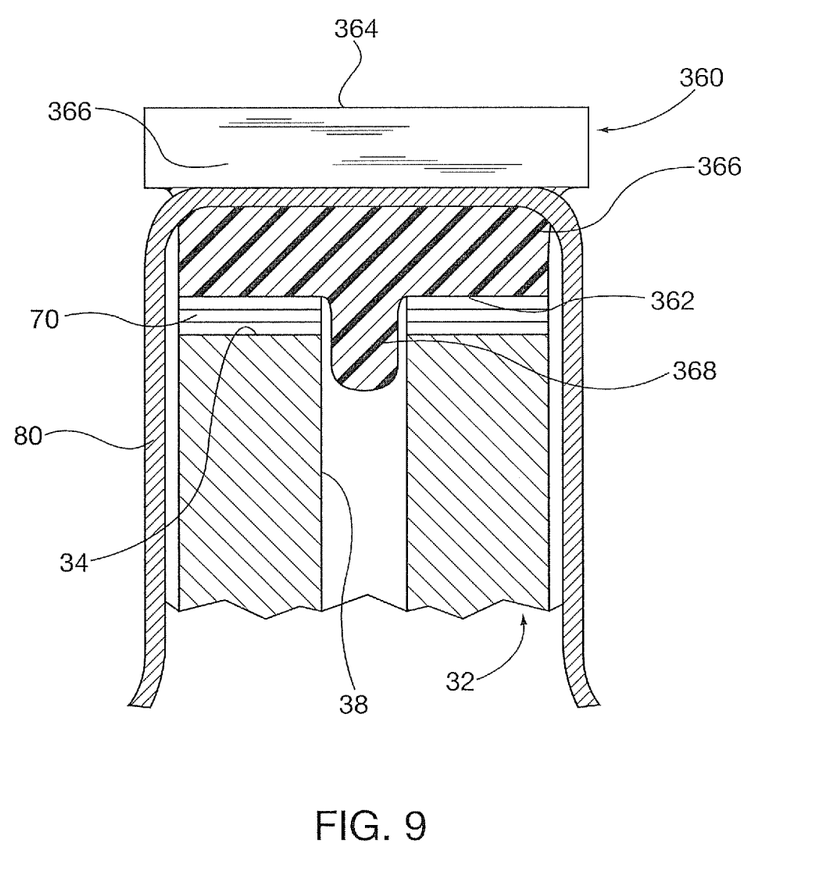
FIG. 9 is a partial cross sectional elevational view of the generator stop of FIG. 8, taken along 9-9 thereof.

Another short circuit stop 360 embodiment is shown in FIGS. 8 and 9, that facilitates wrapping of the flexible fastening strap element 80 about the outer periphery of the stop block engagement surface 366 and the generator brace boss 32. Stop 360 has a bottom surface 362 from which projects a male boss or stud 368 that is inserted into the generator boss aperture 38, thereby limiting lateral shifting movement of the stop relative to the generator boss proximal face.

Although various embodiments which incorporate the teachings of the present invention have been shown and described in detail herein, those skilled in the art can readily devise many other varied embodiments that still incorporate these teachings. For example, the stop block of the present invention may be affixed to the building bolt rather than to the generator brace. While the stop block embodiments shown in the figures herein are affixed to the generator brace with a fastener engaging an engagement surface formed within the stop, the stop block may eliminate an engagement surface by adhesively affixing or otherwise bonding it to the generator brace or building bolt. Reinforced adhesive tape may be substituted as a fastening element. Alternatively, the fastening element may be integrally formed within the stop block. The stop block can be formed in non-rectangular shapes, including cylindrical, hemispherical or frustoconical profiles.

What is claimed is:

1. A stop apparatus for limiting relative movement between a paired induction machine component and a brace, comprising:
    a stop block adapted for interposition between the paired components, having:
        a bottom face for abutment against one of the paired components;
        a top face in opposed spaced orientation relative to the other component, and defining a gap there between; and
        an engagement surface; and
    a fastener coupled to the engagement surface and the one of the paired components, for affixing the stop block thereto.

2. The apparatus of claim 1, wherein the engagement surface is a groove defined by at least one of the faces.

3. The apparatus of claim 1, wherein the engagement surface is an aperture defined within the bottom face.

4. The apparatus of claim 3, wherein the aperture defines threads for mating engagement with the fastener.

5. The apparatus of claim 3, wherein the aperture extends through the stop block from the bottom face to the top face.

6. The apparatus of claim 1, wherein the bottom face defines a male projection for engagement within an aperture defined by the one of the paired components.

7. The apparatus of claim 1, wherein the fastener is an elongated member having threads on one end thereof in mating engagement with the engagement surface.

8. The apparatus of claim 1, wherein the fastener is a flexible elongated member adapted for tensioned engagement between the engagement surface and the one of the paired components.

9. The apparatus of claim 8, wherein the one of the paired components is a brace having a brace aperture defined therein and the flexible elongated member is captured within the brace aperture.

10. The apparatus of claim 1 further comprising:
    at least one spacer shim interposed between the at least one of the paired components and the stop block bottom face, for selectively varying the gap.

11. An induction machine apparatus, comprising:
    a paired induction machine component and brace capable of relative movement there between during an electrical short circuit event within the machine;
    a stop block interposed between the paired components for limiting the relative movement between the paired components, having:
        a bottom face for abutment against one of the paired components;
        a top face in opposed spaced orientation relative to the other component, and defining a gap there between; and
        an engagement surface; and a fastener coupled to the engagement surface and the one of the paired components, for affixing the stop block thereto.

12. The apparatus of claim 11, wherein:
the paired components are a generator building bolt and the brace is a generator brace;
the brace aperture defines threads adapted for receipt of a threaded stop stud;
the stop block bottom face abuts the generator brace; and
the fastener is captured within the brace aperture.

13. The apparatus of claim 12, wherein the fastener is a flexible elongated member passing through the brace aperture and in tensioned engagement between the brace and the stop block engagement surface.

14. The apparatus of claim 11, wherein the fastener is selected from the group consisting of: an elongated member having threads on one end thereof in mating engagement with the engagement surface; a threaded stud, a threaded screw, a flexible elongated member adapted for tensioned engagement between the engagement surface and the one of the paired components; a cable tie; a strap; cordage; or a strap defining mating hook and loop fasteners.

15. The apparatus of claim 11, wherein the stop block engagement surface is selected from the group consisting of: a groove defined by at least one of the faces; an aperture defined within the bottom face; a threaded aperture defined within the bottom face; an aperture extending through the stop block from the bottom face to the top face; or a male projection extending from the bottom face.

16. The apparatus of claim 11, further comprising:
at least one shim interposed between the at least one of the paired components and the stop block bottom face, for selectively varying the gap.

17. In a generator apparatus of the type having a building bolt and a generator brace that are capable of relative movement there between during an electrical short circuit event within the generator, a method for installing a short circuit stop block for limiting the relative movement, comprising:
providing a stop block having: a bottom face; a top face; and an engagement surface;
interposing the stop block between the building bolt and the generator brace by abutting the bottom surface against the generator brace; and
affixing the stop block to the generator brace with a fastener coupled to the engagement surface and the generator brace.

18. The method of claim 17, further comprising passing the fastener through a brace aperture defined within the generator brace.

19. The method of claim 18, wherein the brace aperture has a threaded stop stud engaged therein, and wherein the method further comprises:
removing the stop stud and thereby clearing the brace aperture prior to the interposing step;
interposing the stop block;
passing the fastener through the brace aperture;
coupling the fastener to the engagement surface; and
tensioning the fastener between the stop block and the generator brace.

20. The method of claim 19, wherein:
the stop block engagement surface is selected from the group consisting of: a groove defined by at least one of the faces; an aperture defined within the bottom face; a threaded aperture defined within the bottom face; an aperture extending through the stop block from the bottom face to the top face; or a male projection extending from the bottom face; and
the fastener is selected from the group consisting of: an elongated member having threads on one end thereof in mating engagement with the engagement surface; a threaded stud, a threaded screw, a flexible elongated member in tensioned engagement between the engagement surface and the generator brace; a cable tie; a strap; cordage; or a strap defining mating hook and loop fasteners.

* * * * *